United States Patent Office 2,839,448
Patented June 17, 1958

2,839,448

DENTIFRICE CONTAINING A STANNOUS COMPOUND AND A CARBOXYLATED ALKYL CELLULOSE ETHER

Richard E. Hager, North College Hill, and Carroll R. Reiss, Green Township, Hamilton County, Ohio, assignors to The Procter & Gamble Company, Cincinnati, Ohio, a corporation of Ohio No Drawing. Application February 9, 1955
Serial No. 487,211

8 Claims. (Cl. 167—93)

This invention relates to dentifrices. More particularly, it relates to toothpastes containing stannous tin ions wherein certain cellulose derivatives are used as binders.

Toothpaste compositions, in general, comprise, as a polishing material, an essentially water-insoluble abrasive material maintained in suspension in a liquid phase or vehicle. Active ingredients, added to the toothpaste to give it special properties, are dissolved or dispersed in this liquid. In order to maintain the combination as stable as possible, and to prevent separation or drainage of liquid from the solid contents of the paste, a bodying agent or binder is added. This binder creates a network which retains the liquid distributed throughout the paste.

In some toothpaste formulations, it is desirable to incorporate certain stannous tin compounds as active materials, and the selection of a material which is compatible with the tin, and is also a satisfactory binder, has been a difficult problem. Incompatibility of the binder material either results in poor texture of the toothpaste or in the development of foul odors and/or tastes. These results may be apparent either at the time of formulation or when the toothpastes are aged for a period of time.

It has been found that many natural gum binders are not compatible with stannous tin in a toothpaste. Examples of these include not only materials such as gum karaya, gum arabic, etc., but, also seaweed derivatives such as Irish moss, alginates, etc. Gum tragacanth has an unpleasant musty flavor, and wide variations of texture upon aging result from its use as a binder material. All of the above-listed materials are intended to be included in the term "natural gum binders" as used hereinafter.

It has now been found that certain cellulose derivatives are exceptional binder materials and are also entirely compatible with stannous tin compounds in toothpaste.

Accordingly, one of the objects of this invention is to provide a toothpaste containing stannous tin and a compatible cellulose derivative binder.

Another object is to provide a toothpaste containing stannous tin which will not develop an unpleasant odor and/or taste.

Other objects and advantageous features will be apparent from the following detailed description.

The cellulose derivatives for use as binders must be water-soluble and capable of thickening the toothpaste vehicle. Preferred types of derivatives are the cellulose ethers, and especially good results have been obtained with water-soluble carboxylated alkyl cellulose ethers, which may be defined as compounds in which a carboxyl group is substituted in an alkyl chain which is connected to a cellulose radical by an ether linkage. Alkali metal salts such as sodium carboxymethyl cellulose and sodium carboxymethyl hydroxyethyl cellulose are examples of this type of compound. Other cellulose ethers may be used in combination with carboxylated ethers. Toothpastes of this invention shall comprise at least one water-soluble salt of a carboxylated cellulose ether.

Since the binder materials of this invention are compatible with the stannous tin in a wide range of proportions, the amount of binder to be used is not critical and can be selected to give the desired consistency to the toothpaste. Satisfactory toothpastes can be prepared containing from 0.5 to 3.0% by weight of binder, and a preferred amount would be from 0.8 to 1.5%.

A preferred class of toothpastes within the scope of this invention, are those in which the stannous tin ions are supplied to the toothpastes in water-soluble compounds containing fluorine also. An example of such a compound is stannous fluoride ($SnF_2$). Other compounds in this preferred class may contain chlorine in addition to fluorine. Examples of such compounds include stannous chlorofluoride ($SnClF$) and stannous monochlorotrifluoride ($Sn_2ClF_3$). A preferred amount of stannous tin is from 50 p. p. m. to 1000 p. p. m. However, in fluorine containing compounds too large an amount of fluorine may be harmful. For best results the toothpaste should have a pH not less than about 3.8, since at a lower pH the toothpaste components tends to separate. The pH should not exceed about 11.5. A preferred range is from about 4.6 to about 10.5.

It may be desirable to add some substance to shorten the texture of the paste and make it less tacky. Although such materials may have some binding properties, for the purpose of this invention, they are to be regarded as shortening agents. Materials such as colloidal magnesium aluminum silicate have proved very effective for this purpose. Up to 5% of the shortening agent may be desirable, depending on the amount and type of binder. However, excellent results may be obtained using 0.1 to 1.0%.

The abrasive materials for the toothpaste should be selected so as to provide a satisfactory cleaning action on the teeth, and should, of course, be compatible with the other components. Calcium pyrophosphate and alumina are very satisfactory.

The sudsing agents commonly used will be satisfactory for the toothpaste formulation. Examples of these include alkyl sulfates, monoglyceride sulfonates, alkyl sulfoacetates, sarcosides, soaps etc.

Other suitable components of pastes which include humectants, such as glycerine, sorbitol, etc., flavorings such as oil of wintergreen, peppermint, etc. and sweetening agents will suggest themselves to those skilled in the art.

A toothpaste within the scope of this invention can be made by forming an aqueous solution containing stannous tin and an abrasive, and adding to said solution a sufficient amount of a water-soluble salt of a carboxylated alkyl ether to maintain said solution distributed throughout the paste.

The following basic paste formulation was used to test the compatibility of various binder materials with stannous fluoride:

Stannous fluoride_____ 0.40% by wt.
Calcium pyrophosphate____ 42.00%.
Glycerine_____ 25.00%.
Binder_____ To give desired consistency.
Water_____ Balance.

plus minor amounts of sudsing agents, flavoring and sweetening.

The following binders were then used in the formulation with the results as indicated:

A. Irish moss—foul odor
B. Sodium alginate—formed a lumpy paste
C. Gum tragacanth—unpleasant musty taste and odor
D. Gum karaya—unacceptable texture E. Sodium carboxymethylcellulose—very good odor and taste, acceptable texture F. Sodium carboxymethyl hydroxyethyl cellulose—very good odor and taste; acceptable texture.

What is claimed is:

1. The method of making a toothpaste which comprises forming an aqueous solution containing stannous tin ions and an abrasive and blending with said solution a sufficient amount of a water-soluble salt of a carboxylated alkyl cellulose ether to maintain said stannous tin and said abrasive uniformly distributed throughout the paste.

2. A toothpaste comprising a water-soluble stannous compound and at least one water-soluble salt of a carboxylated alkyl cellulose ether, said toothpaste being free from natural gum binders.

3. A toothpaste according to claim 2 containing additionally calcium pyrophosphate.

4. A toothpaste comprising stannous fluoride and sodium carboxymethyl cellulose, said toothpaste being free from natural gum binders.

5. A toothpaste according to claim 4 containing additionally magnesium aluminum silicate.

6. A toothpaste comprising a water-soluble stannous compound in an amount equivalent to 50 to about 3000 parts of tin per million parts of toothpaste and from 0.5% to 3.0% of binder, said binder comprising at least one water-soluble salt of a carboxylated alkyl cellulose ether, said toothpaste being free from natural gum binders.

7. A toothpaste comprising a water-soluble compound containing stannous tin in an amount equivalent to 50 to about 3000 parts of tin per million parts of toothpaste, from 0.1% to 1.0% magnesium aluminum silicate, and from 0.5% to 3.0% sodium carboxymethyl cellulose, said toothpaste being free from natural gum binders.

8. A toothpaste comprising stannous fluoride in an amount equivalent to 50 to about 3000 parts of tin per million parts of toothpaste, from 0.1% to 1.0% magnesium aluminum silicate, and from 0.5% to 3.0% sodium carboxymethyl cellulose, said toothpaste being free from natural gum binders.

References Cited in the file of this patent

UNITED STATES PATENTS

| | | |
|---|---|---|
| 1,943,856 | Cross | Jan. 16, 1934 |
| 2,550,207 | Tainter | Apr. 24, 1951 |
| 2,554,465 | Kraus | May 22, 1951 |
| 2,588,324 | Lewis | Mar. 4, 1952 |

FOREIGN PATENTS

| | | |
|---|---|---|
| 158,717 | Australia | Sept. 9, 1954 |

OTHER REFERENCES

Science, vol. 120 (1954), pp. 316 and 317.
Drug Trade News, vol. 29 (22), Oct. 25, 1954, p. 6.
Muhler et al.: J. Am. Dent. Assn., February 1955, pp. 163–166.